(12) United States Patent
Reid

(10) Patent No.: US 10,638,731 B2
(45) Date of Patent: May 5, 2020

(54) AQUARIUM WITH INTEGRATED CLEANING SYSTEM

(71) Applicant: Rolf C. Hagen Inc., Montreal (CA)

(72) Inventor: Robert Reid, St. Lazare (CA)

(73) Assignee: Rolf C. Hagen Inc., Montreal (CA)

( * ) Notice: Subject to any disclaimer, the term of this patent is extended or adjusted under 35 U.S.C. 154(b) by 362 days.

(21) Appl. No.: 15/618,838

(22) Filed: Jun. 9, 2017

(65) Prior Publication Data
US 2018/0352791 A1    Dec. 13, 2018

(51) Int. Cl.
*A01K 63/04* (2006.01)
*A01K 63/00* (2017.01)

(52) U.S. Cl.
CPC .......... *A01K 63/045* (2013.01); *A01K 63/003* (2013.01)

(58) Field of Classification Search
CPC .... A01K 63/04; A01K 63/045; A01K 63/047; A01K 63/003
See application file for complete search history.

(56) References Cited

U.S. PATENT DOCUMENTS

| | | |
|---|---|---|
| 3,321,081 A | 5/1967 | Willinger |
| 3,418,973 A | 12/1968 | Saito |
| 3,584,602 A | 6/1971 | Stasio |
| 3,759,223 A | 9/1973 | D'Andrea |
| 3,785,342 A | 1/1974 | Rogers |
| 3,900,004 A | 8/1975 | Goldman et al. |
| 4,957,623 A | 9/1990 | Henzlik |
| 5,690,054 A | 11/1997 | Allen |
| 5,849,185 A | 12/1998 | Judy, Jr. |
| 6,276,302 B1 | 8/2001 | Lee |
| 6,352,051 B1 | 3/2002 | Wang |
| 6,533,928 B1 | 3/2003 | Terato |
| 6,755,154 B1 | 6/2004 | Goldman et al. |
| 6,755,981 B2 | 6/2004 | Terato |

(Continued)

FOREIGN PATENT DOCUMENTS

JP    2011-160695 A1    8/2011

OTHER PUBLICATIONS

PCT/IB2018/000677, Sep. 21, 2018, International Search Report and Written Opinion.

(Continued)

*Primary Examiner* — Kristen C Hayes
(74) *Attorney, Agent, or Firm* — Wolf, Greenfield & Sacks, P.C.

(57) ABSTRACT

Various embodiments of an aquarium and its method of use are disclosed. In some embodiments, the aquarium includes a first container for holding water and fish, plants, and/or other aquatic organism, a second container for collecting dirty water, and a passageway arranged to flush water from the first container to the second container. The passageway is in fluid communication with an outlet of the first container. The second container is arranged to receive the outlet such that fluid flows from the passageway, through the outlet, and into the second container. The outlet may be selectively opened by a user via a valve. Opening the valve causes gravity to flush water and debris from the first container, through the passageway, through the valve and into the second container, where the dirty water can be stored or discarded by disconnecting the second container from the aquarium ad dumping the dirty water.

26 Claims, 14 Drawing Sheets

(56) References Cited

U.S. PATENT DOCUMENTS

| | | | |
|---|---|---|---|
| 7,303,665 B1 | 12/2007 | Claudio-Alvarado | |
| 7,341,022 B2* | 3/2008 | Ming | A01K 63/003 119/245 |
| 7,537,692 B1 | 5/2009 | Hadden | |
| 7,681,530 B2* | 3/2010 | Perry | A01K 63/003 119/255 |
| 8,006,646 B2 | 8/2011 | Grad | |
| 8,347,820 B2 | 1/2013 | Sigmon et al. | |
| 9,282,728 B2* | 3/2016 | Reid | A01K 63/045 |
| 2007/0119381 A1 | 5/2007 | Chang | |
| 2007/0144449 A1* | 6/2007 | Ming | A01K 63/003 119/253 |
| 2008/0072835 A1* | 3/2008 | Hongtawornsiri | A01G 9/02 119/246 |
| 2008/0105210 A1* | 5/2008 | Perry | A01K 63/003 119/253 |
| 2012/0325755 A1 | 12/2012 | Turover et al. | |
| 2015/0000607 A1* | 1/2015 | Reid | A01K 63/045 119/248 |
| 2019/0045755 A1* | 2/2019 | Engelhardt | A01K 31/06 |

OTHER PUBLICATIONS

International Search Report and Written Opinion for International Application No. PCT/IB2018/000677, dated Sep. 21, 2018.

\* cited by examiner

AQUARIUM WITH INTEGRATED CLEANING SYSTEM

FIELD

The disclosed embodiments relate generally to aquariums and more particularly to aquariums having an integrated cleaning system.

BACKGROUND

Aquariums provide an environment for keeping fish, plants and/or other aquatic organisms. Over time, waste and debris from the fish and other aquatic organisms as well as bacteria, algae, and uneaten food accumulate within the aquarium. To help maintain the health of the fish and other aquatic organisms, the water is filtered, and the built-up waste and debris are periodically removed from the aquarium. After certain periods of time, the water within the aquarium is also replaced.

SUMMARY

According to one embodiment, an aquarium includes a first container arranged to hold a fluid, the first container having an outlet and a passageway in fluid communication with the outlet, wherein fluid flows from the first container to the outlet via the passageway, the outlet being selectively opened via a valve, and a second container arranged to hold a fluid, wherein the second container is arranged to mate with the first container such that the second container receives the outlet of the first container, and wherein fluid flows from the passageway through the outlet and into the second container when the valve is in an open position.

According to another embodiment, a method of removing dirty water from an aquarium includes mating a second container to a first container, the first container having an outlet and a passageway in fluid communication with the outlet, wherein fluid flows from the first container to the outlet via the passageway, the second container being arranged to receive the outlet, the outlet being selectively opened and closed via a valve, and moving the valve into an open position, wherein fluid flows from the first container through the outlet and into the second container, waste being entrained with the flowing fluid and transferred to the second container.

It should be appreciated that the foregoing concepts, and additional concepts discussed below, may be arranged in any suitable combination, as the present disclosure is not limited in this respect.

The foregoing and other aspects, embodiments, and features of the present teachings can be more fully understood from the following description in conjunction with the accompanying drawings.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
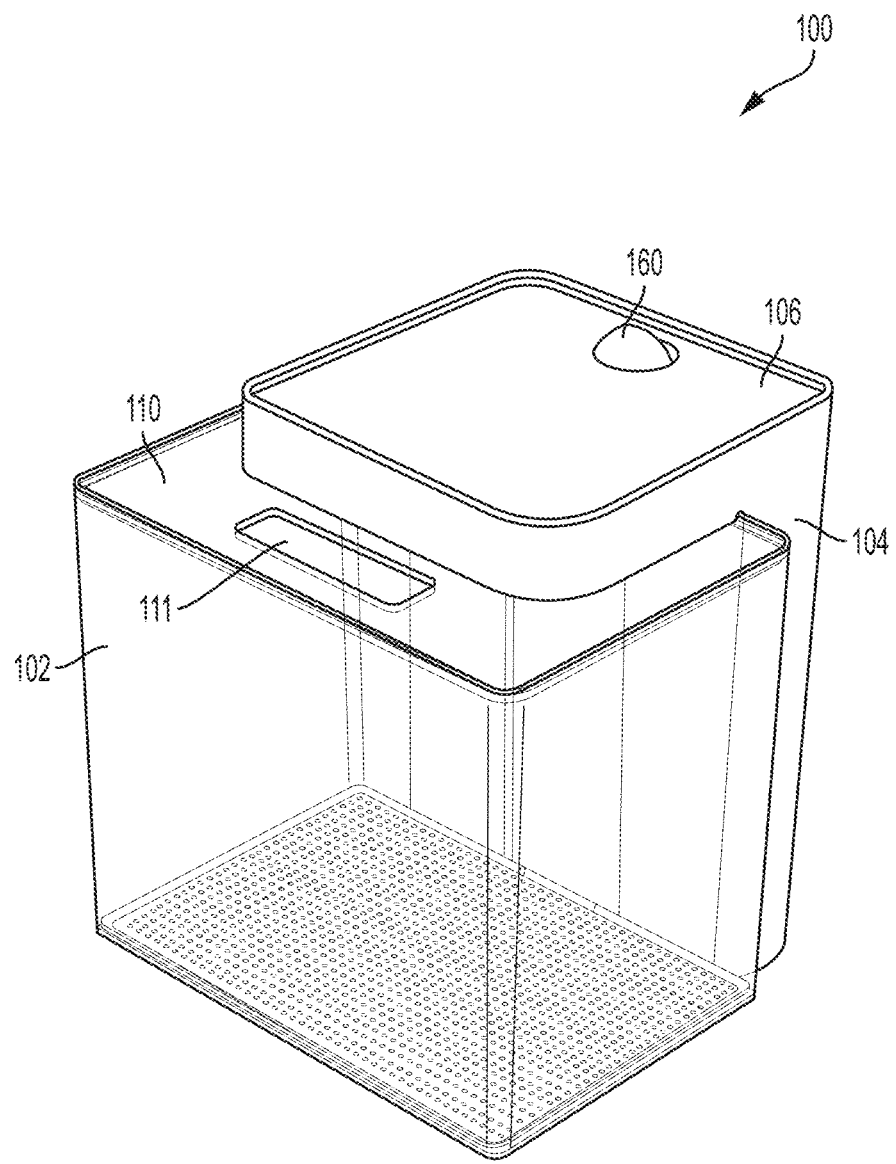
FIG. 1 is a front perspective view of an aquarium according to one embodiment.

Aquariums provide an environment for keeping fish and/or other aquatic organisms. Over time, waste and debris from the fish and/or other aquatic organisms, as well as bacteria, algae and uneaten food, accumulate within the aquarium. To help maintain the health of the fish and other aquatic organisms, the built-up waste and debris are periodically removed from the aquarium. After certain periods of time, the water within the aquarium is also replaced.

The inventors have recognized that advantages may be realized by having an aquarium that provides simple removal of waste water. For example, by just pulling on a handle, aquarium water may be flushed out or drawn from the bottom of the tank, taking debris that has settled to the bottom along with the water. In such an example, the drawn off water and waste may be flushed from a first container to a second container. The now dirty water in the second container may be discarded and fresh clean water can be added to the first container. In some embodiments, a valve is used to flush aquarium water to the secondary tank. In such embodiments, the handle may be connected to the valve, with the user moving the handle to selectively open and close an outlet of the first container to stop and start transfer of water to the second container.

The inventors have also recognized that it is desirable to reduce the chance of spillage of water during the removal of water and the replacement of water, since such maintenance is typically messy and laborious. Additionally, in at least some embodiments, it is desirable that such an aquarium be easily manufactured and readily assembled. As will be appreciated, the currently disclosed concepts may be implemented in any appropriate aquarium, regardless of the ease of construction and/or assembly.

Accordingly, in some embodiments, the aquarium includes a first container that acts as a primary aquarium tank for housing fish, plants, and/or other aquatic organisms, and a second container that acts as a waste collection tank for collecting dirty water and/or debris. In such embodiments, dirty water and/or debris may be selectively transferred from the first container to the second container via an outlet in the first container. For example, the user may open and close the outlet to start and stop transferring water from the first container to the second container. In such an example, debris that has settled at or near the bottom of the first container may be flushed from the first container as water travels from the bottom of the first container to the second container. The dirty water and/or debris may, in turn, be disposed from the second container.

In some embodiments, fresh water may be added to the first container after the dirty water and/or debris has been transferred to the second container. In other embodiments, fresh water may be added to the first tank prior to flushing dirty water and/or debris water from the first tank to the second tank, such as to increase the water level in the first container, as will be described.

In some embodiments, the second container is arranged to removably mate with the first container. In such embodiments, the second container may have a complementary shape, height, width, and/or any other appropriate geometry such that the second container may be associated with the first container. For example, the second container may extend along an entire side or surface of the first container, or the second container may extend along only a portion of a side or surface of the first container.

In some embodiments, the second container is removably attached to the aquarium such that the dirty water and/or debris can be discarded after being transferred from the first container to the second container. For example, the second container may include one or more fasteners (e.g., tabs, or clips) that engage with corresponding fasteners on a base of the aquarium. In such an example, the first container also may be removably attached to the base of the aquarium (e.g., via corresponding fasteners), such that the first and second containers are positioned adjacent to one another, with the first container being associated with the second container. As will be appreciated, the second container may be removably attached to other portions of the aquarium, such as to the first container or to the top of the container. For example, the second container may include one or more fasteners (e.g., tabs) that engage with corresponding fasteners on the first container.

In some embodiments, the second container is arranged to receive the outlet of the first container. For example, the second tank may include an inlet corresponding to a shape, size and location of the outlet of the first container. In another example, the second container may include a slot or open space to accommodate the outlet of the first container.

In some embodiments, water may be transferred from the first container to the second container via a conduit or passageway. In some embodiments, the passageway is vertically aligned. In some embodiments, the passageway is located in the first container. For example, the passageway may be at least partially formed by the first container. In one such example, at least a portion of the passageway may be formed in a channel formed in a first side, or a portion of the first side, of the first container. In such an example, the first side of the first container and the passageway may be positioned adjacent to the second container. In some embodiments, at least a portion of the passageway may be formed via a passageway insert that is attached to the first container. In some embodiments, an opening or entrance to the passageway may be located at or near the bottom of the first container.

In some embodiments, the first container is in fluid communication with the passageway such that fluid may travel from the first container through the outlet and into the second container. As will be appreciated from the above, the fluid may include dirty water and or debris that is drawn from the bottom of the first container and transferred to the second container. In some embodiments, the outlet of the first container may be formed at the end of the passageway, with the second container arranged to receive the outlet. In some embodiments, the outlet may include a valve that may be selectively opened and closed by the user to transfer water from the first container to the second container.

In some embodiments, the aquarium may include a waste collection area. For purposes herein, the waste collection area may include an area of the aquarium, such as the bottom of the first container, where dirt and/or debris may be collected. For example, debris may settle on the bottom of the first container via the force of gravity. In some embodiments, the aquarium may include a waste collection insert that is placed on the bottom or floor of the first container. In some embodiments, the waste collection insert includes a plate with a plurality of openings through which dirt and/or debris may pass. In such embodiments, the dirt and/or debris may pass through the plurality of openings and settle on the bottom of the first container. In some embodiments, the waste collection insert is located above an opening to the passageway such that dirt and debris may be entrained in the water that is flushed from the first container to the second container.

The disclosed embodiments facilitate the removal of waste and debris from the aquarium by transferring water from the first container to the second container. In some embodiments, the fluid in the first container may have a fluid level (or water level) that is greater than a preselected fluid level corresponding to a height of the outlet of the first container. Without wishing to be bound by theory, in such embodiments, a pressure differential may be created due to the difference in height between the fluid level in the first container being greater than the height of the outlet. Consequently, the fluid within the first container may flow from the first container, through the passageway, and into the second container via the outlet when the user opens the outlet. In some embodiments, as fluid flows to the outlet (via the passageway), the fluid may travel through the waste collection area. In such embodiments, waste and debris at the waste collection area may be entrained with the flowing fluid such that the waste and debris are transported along with the fluid to the second container. As will be appreciated, such a fluid flushing may remove at least some of the waste and debris from the first container. Such a fluid transfer also may remove all of the waste and debris from the first container. As will be further appreciated, dirt and/or debris that is floating in the water of the first container (and not necessarily settled on the bottom of the first container) also may be removed from the first container when water travels to the second container.

In some embodiments, water need not be added to the first container in order to transfer water from the first container to the second container. For example, the user may simply pull on the handle to transfer fluid from the first container to the second container. In such embodiments, water may be added to the first container when the fish and/or other aquatic organisms are first added to the container or after dirty water and/or debris has been removed from the first container. As will be appreciated in view of the above, the water added to the tank may have a water level that is higher than the prescribed fluid level (e.g., higher than the height of the outlet of the first container) such that the requisite pressure differential is established to transfer water from the first container to the second container. In such an example, after the fluid has been transferred to the second container, fresh water may be added to the first container to raise the fluid level in the first container.

In other embodiments, if the fluid level is at or below the height of the outlet of the first container, water may be added to the tank to raise the water to the level needed to establish the above-described pressure differential. Once the water level has been raised, dirty water and/or debris may be selectively transferred from the first container to the second container when the outlet is opened.

Figure 2:
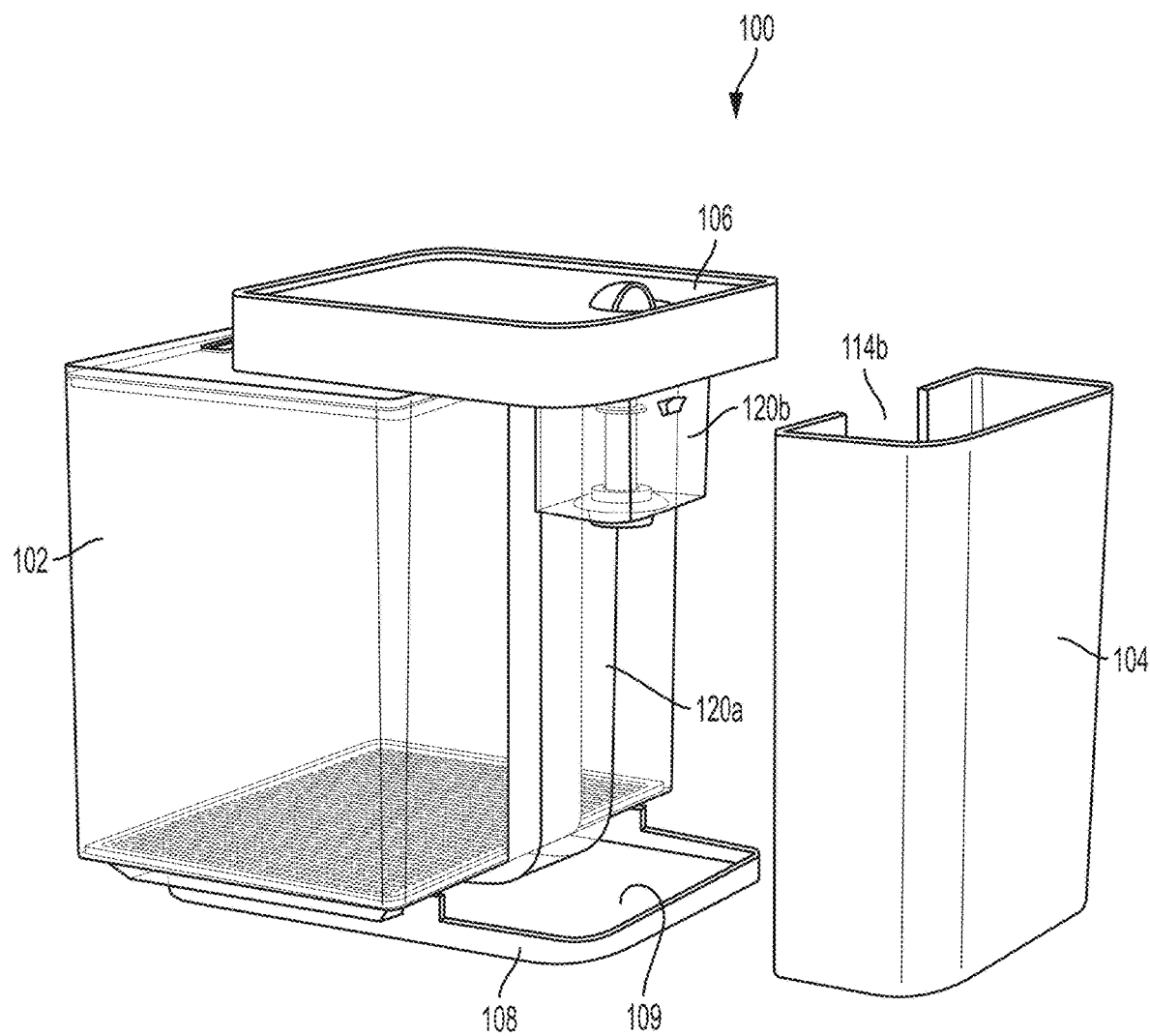
FIG. 2 is a rear perspective view of the aquarium of FIG. 1, with a second container moved away from the aquarium.

Turning now to the figures, FIGS. 1 and 2 show an aquarium 100 according to embodiments of the present disclosure. As shown in these views, the aquarium 100 includes a first container 102 for holding water and fish, plants and/or other aquatic organisms (not shown), and a second container 104 for collecting dirty water and/or debris. As also shown in these views, the aquarium 100 includes a top 106 and a base 108, to which the first and second containers are attached.

In some embodiments, as shown in FIGS. 1-2 and 4A-4E, the first container 102 is larger than the second container 104. In such embodiments, as shown in these views, the first container may be longer and wider than the second container. In other embodiments, the first and second containers may be substantially the same size. In some embodiments, the first and second containers may have the same height, while in other embodiments, the first and second containers may have different heights.

According to aspects of the present disclosure, the first and second containers may be removably attached to the aquarium. For example, as shown in FIG. 2, the second container 104 may be removed from the aquarium 100, such as to discard the collected dirty water and debris. In some embodiments, as shown in this view, the base 108 of the aquarium may include an opening 109 into which the bottom of the second container 104 may be received. In such embodiments, the size and shape of the bottom of the second container 104 may correspond to the size and shape of the opening 109 in the base 108. In some embodiments, as shown in FIG. 1, the second container does not extend outwardly beyond the base 108 (e.g., the footprint of the second container does not extend outwardly beyond the footprint of the base).

Figure 4A:
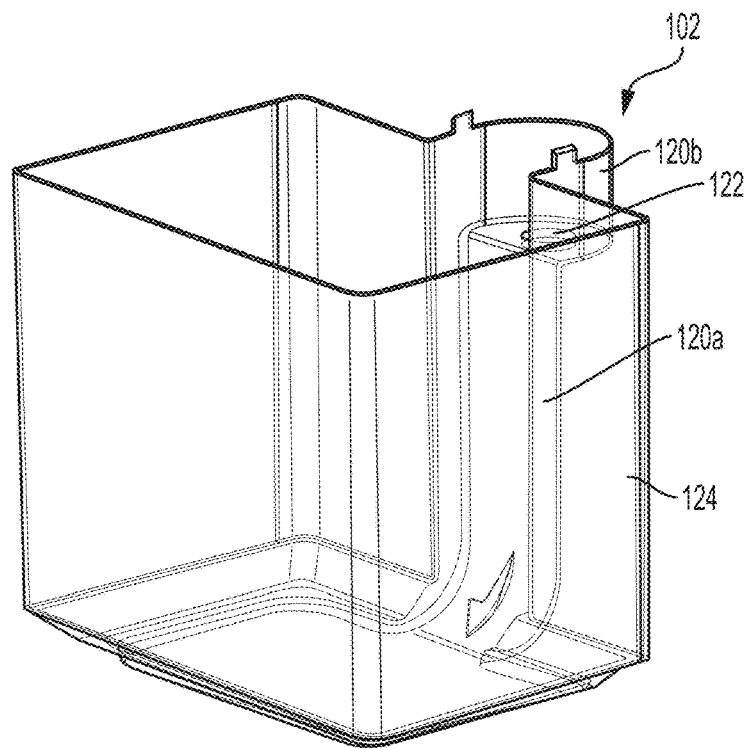
FIG. 4A is a perspective view of a first container of an aquarium according to one embodiment.
Figure 4B:
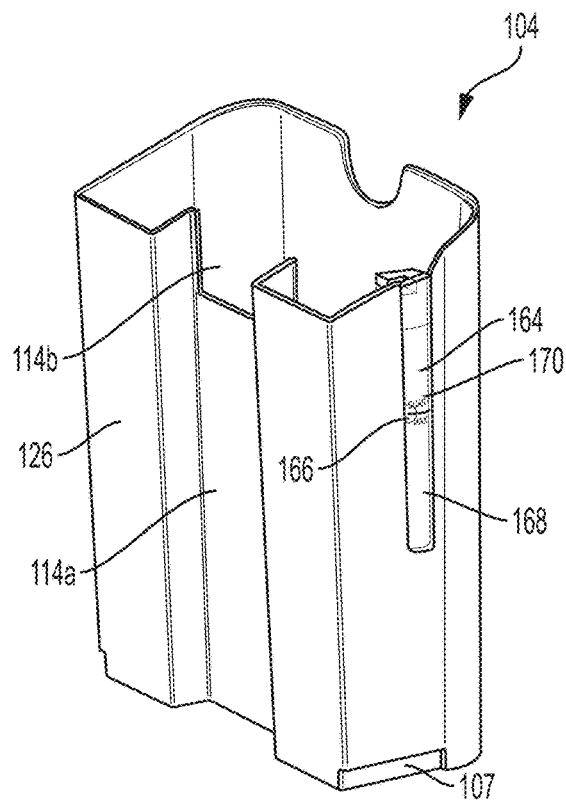
FIG. 4B is a perspective view of a second container of an aquarium according to one embodiment.
Figure 4C:
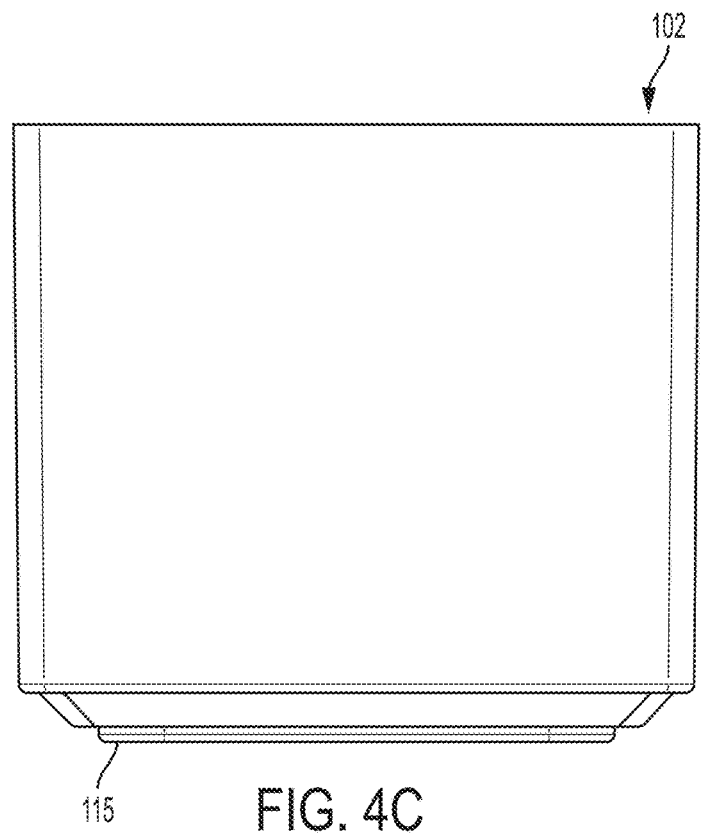
FIG. 4C is a front view of the first container of FIG. 4A.
Figure 4D:
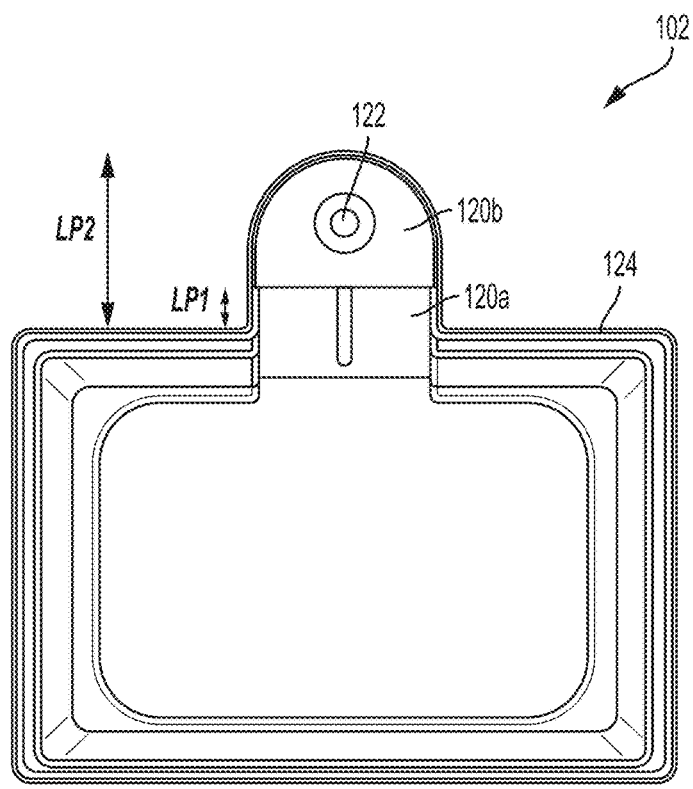
FIG. 4D is a top view of the first container of FIG. 4A.
Figure 4E:
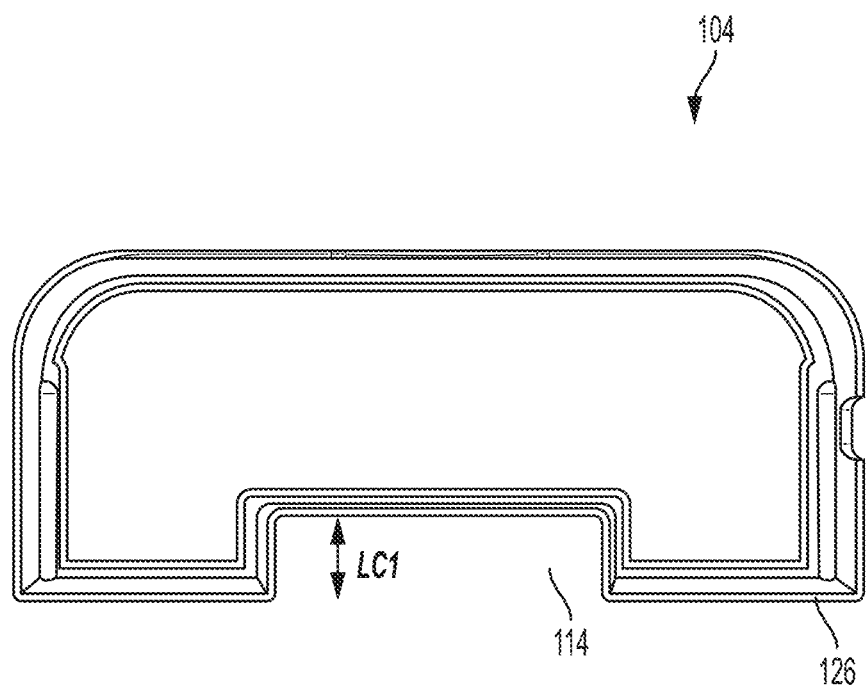
FIG. 4E is a top view of the second container of FIG. 4B.
Figure 6:
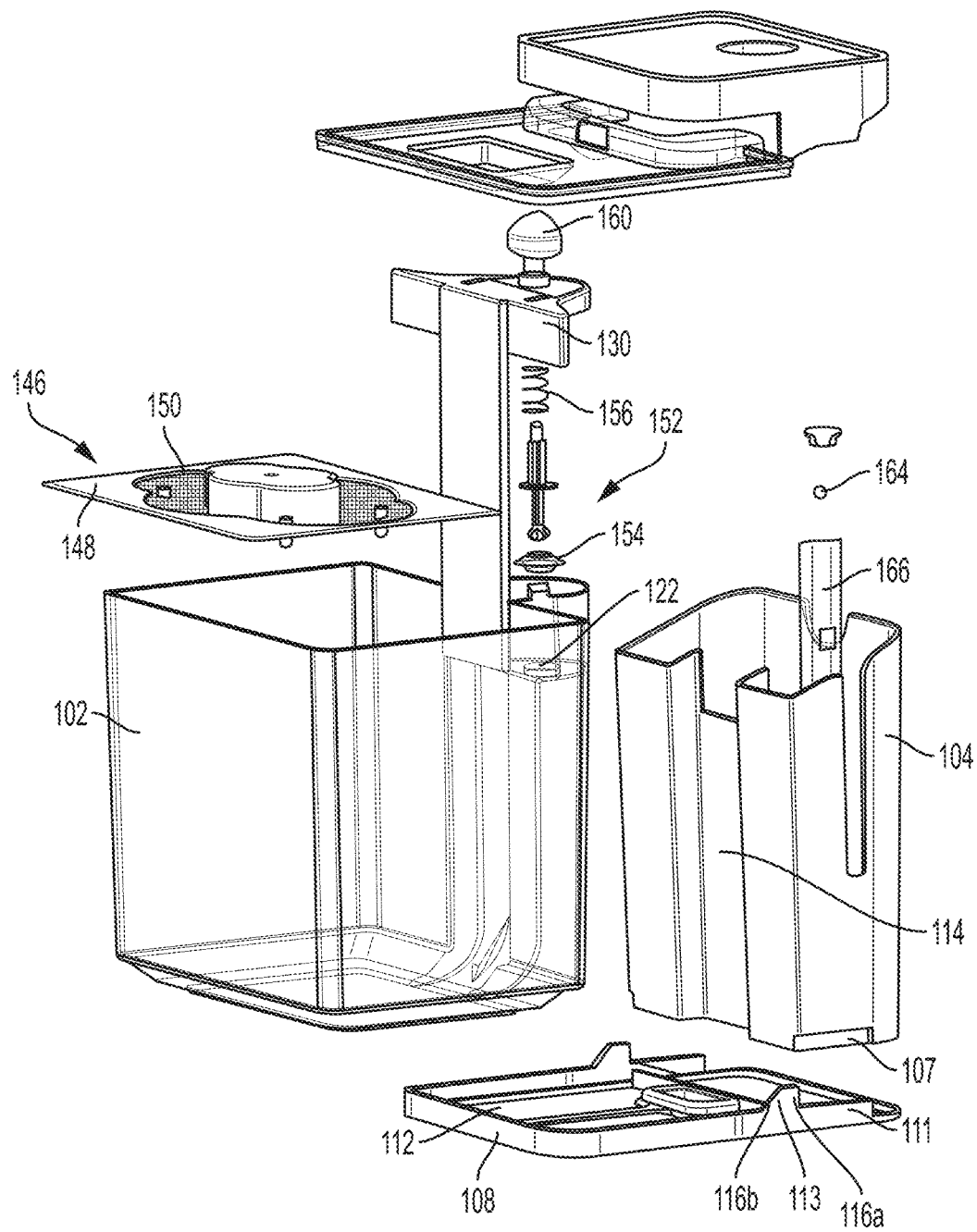
FIG. 6 is an exploded perspective view of an aquarium according some embodiments.

In some embodiments, as shown in FIGS. 4E and 6, the bottom of the second container 104 includes one or more cutouts 107 that engage with corresponding protrusions 111 on the base 108 (see FIG. 6). In such embodiments, the protrusions 111 on the base 108 may be inserted into the cutouts 107 on the second container when the second container is placed on the base. As will be appreciated, such protrusions and corresponding cutouts may facilitate alignment and attachment of the second container and the base.

As will be appreciated, although the base is shown as having protrusions and the second container is shown as having corresponding cutouts, the base may have cutouts and the second container may have corresponding protrusions in other embodiments. The base also may have one or more protrusions for aligning the second container with respect to the base, without the second container having corresponding cutouts. For example, the base includes protrusions 113 that may align the second container on the base. In such an example, a first side 116a of the protrusion 113 may align the position of the second container on the base. As will be further appreciated, and as shown in FIGS. 1 and 2, the base and second container need not have corresponding features that engage with one another to attach the second container to the base. For example, as shown in these views, the second container may be simply placed in the corresponding opening in the base.

As shown in FIGS. 1 and 6, the first container also may be removable from the aquarium, such as for filling the first container with water. In some embodiments, as shown in FIG. 6, the base has an opening 112 into which at least a portion of the bottom of the first container 102 may be inserted. For example, the bottom of the first container may be tapered, with the size and shape of the opening in the base corresponding to the taper of the bottom of the first container. In other embodiments, the bottom of the first container may include a ledge 115 (see FIG. 4C) which is received by the opening in the base. In such embodiments, the size and shape of the opening 112 in the base may correspond to the size and shape of the ledge 115. As shown in FIG. 2, in such embodiments, at least a portion of the bottom of the first container may also rest on top of the base 108. As will be appreciated, in such embodiments, the first container may be larger (e.g., longer and wider) than the base).

In some embodiments, the first opening and the bottom of the first container may have corresponding features that engage with one another to attach and/or align the first container to the base and aquarium. For example, as shown in FIG. 6, a second side 116b of the protrusion 113 has an angle that corresponds to the taper of the bottom of the first container. In such an example, this protrusion may align the first container with respect to the base. As will be appreciated, the base and the first container also may have other suitable arrangements in other embodiments.

In some embodiments, the first and second containers 102, 104 are arranged to mate with one another when the first and second containers are attached to the aquarium (e.g., via the base). For example, as shown in FIGS. 2, 4A-4E, and 6, the second container 104 may have cutouts for receiving corresponding protruding portions of the first container. For example, a first cutout 114a in the second container may receive a protruding portion 120a of the first container that forms the passageway used to transfer dirty water and/or debris from the first container to the second container. A second cutout 114b in the second container 104 may receive the protruding portion 120b of the first container in which the outlet 122 of the first container 104 is formed. In this regard, the second container may include a cutout to receive the outlet 122 of the first container.

As shown in FIG. 4B, in some embodiments, the first cutout includes a vertically extending channel formed in an outer surface of a first wall 126 of the second container. In such embodiments, the cutout extends at least partly between a bottom of the second container and a top of the second container. In some embodiments, the channel extends along an entire length of the first wall, from the top to the bottom of the second container. In some embodiments, the cutout extends along a central portion of the first wall 126 of the second container. As also shown in FIG. 4B, in some embodiments, the second cutout 114b includes an opening in the first 126 wall of the second container. For example, the second cutout may include an opening at the top of the vertically-extending channel formed in the first wall of the second container.

Although the first cutout 114a in the second container 104 (see FIG. 4E) and the corresponding protruding portion 120a of the first container 102 (see FIGS. 4A and 4D) have substantially rectangular cross-sectional shapes, the first cutout and corresponding protruding portion may have other suitable shapes. For example, the protruding portion and corresponding cutout may be substantially semi-hemispherical in shape in other embodiments. The protruding portion and corresponding cutout also may be another polygonal or other suitable shape in other embodiments.

As will be appreciated, the shape of the first cutout 114a in the second container need not be the same as the shape of the corresponding protrusion in the first container. For example, the protrusion may have a semi-hemispherical cross-sectional shape while the cutout is substantially square in shape. In such examples, as shown in FIGS. 4D and 4E, irrespective of the shapes of the cutout and protrusion, a length LP1 of the first protrusion 120a, a length of the protrusion 120b extending beyond a first wall 124 of the first container 102, is shorter than a length LC1 of the corresponding cutout 114. Without wishing to be bound by theory, in some embodiments, by having the length LC1 of the cutout 114a longer than the length LP1 of the corresponding protrusion 120a, the first and second containers 102, 104 may be placed adjacent to one another. In some embodiments, the first wall 124 of the first container 104 may be placed flush against a first wall 126 of the second container with such an arrangement.

As with the other embodiments, the second cutout 114b in the second container 104 and the corresponding second protrusion 120b in the first container 102 may have any suitable size and shape. For example, as shown in FIG. 2, both the second cutout 114b and the corresponding second protrusion 114b may be substantially rectangular in shape. However, as shown in FIGS. 4A and 4B, the second cutout 114b in the second container may be rectangular in shape while the protrusion is semi-hemispherical in shape. As will be appreciated, the cutout and protrusion also may have other shapes in other embodiments.

In some embodiments, as illustrated in FIGS. 2, 4D and 4E, a length LP2 of the second protruding portion 120b is longer than a length LC1 of the second cutout 114b. As will be appreciated, as shown in FIG. 4E, the length of the second cutout is the same as the length of the first cutout, since the second cutout 114b is located at the top of the vertically extending channel forming the first cutout 114a. Without wishing to be bound by theory, by having the length LP2 of the second protruding portion 120b be longer than the length LC1 of the second cutout 114b, the outlet disposed in the second protruding portion 120b may be received by the second container 104 (see FIG. 3). In this regard, the outlet 122 may allow water to be transferred into the second container 104 from the first container 102.

In some embodiments, as shown in FIGS. 1 and 2, the first container 102 may include a cover 110. In some embodiments, the cover 110 includes an opening. As will be appreciated, such an opening may be used to add water and/or food into the first container. The opening also may facilitate airflow into and out of the first container. As shown in FIG. 1, the opening may be substantially rectangular in shape and spaced from the top 106 of the aquarium. As will be appreciated, the opening may have other suitable shapes and may be positioned in other locations on the cover.

Figure 8A:
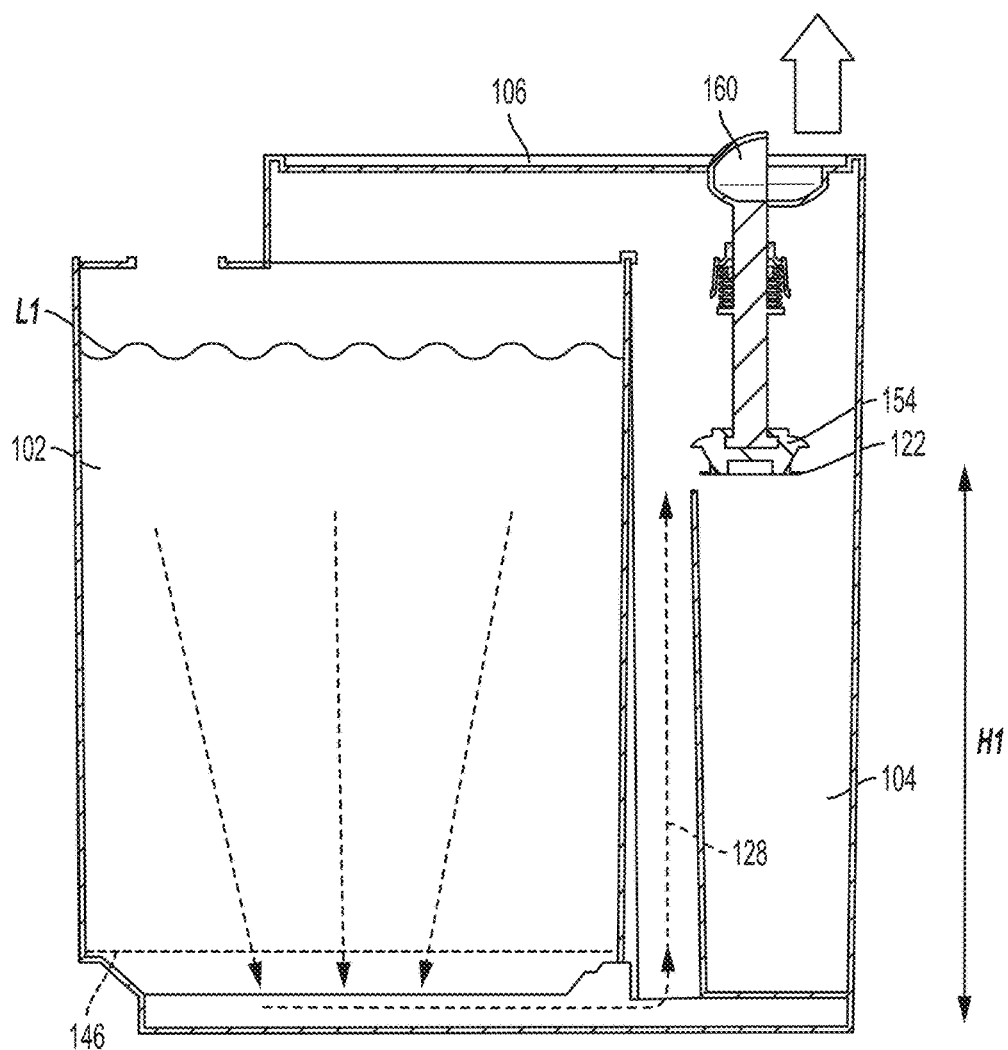
FIG. 8A-FIG. 11 illustrate removal and replacement of fluid from an aquarium according to some embodiments.
Figure 8B:
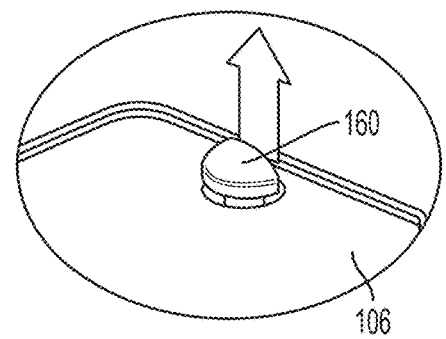

In some embodiments, as shown in FIG. 8A, the aquarium is arranged to transfer dirty water and/or debris from the first container to the second container via a passageway 128. In some embodiments, the passageway 128 is in the first container 102. In some embodiments, the passageway 128 is vertically extending and ends at the outlet 122 of the first container 102.

Figure 5A:
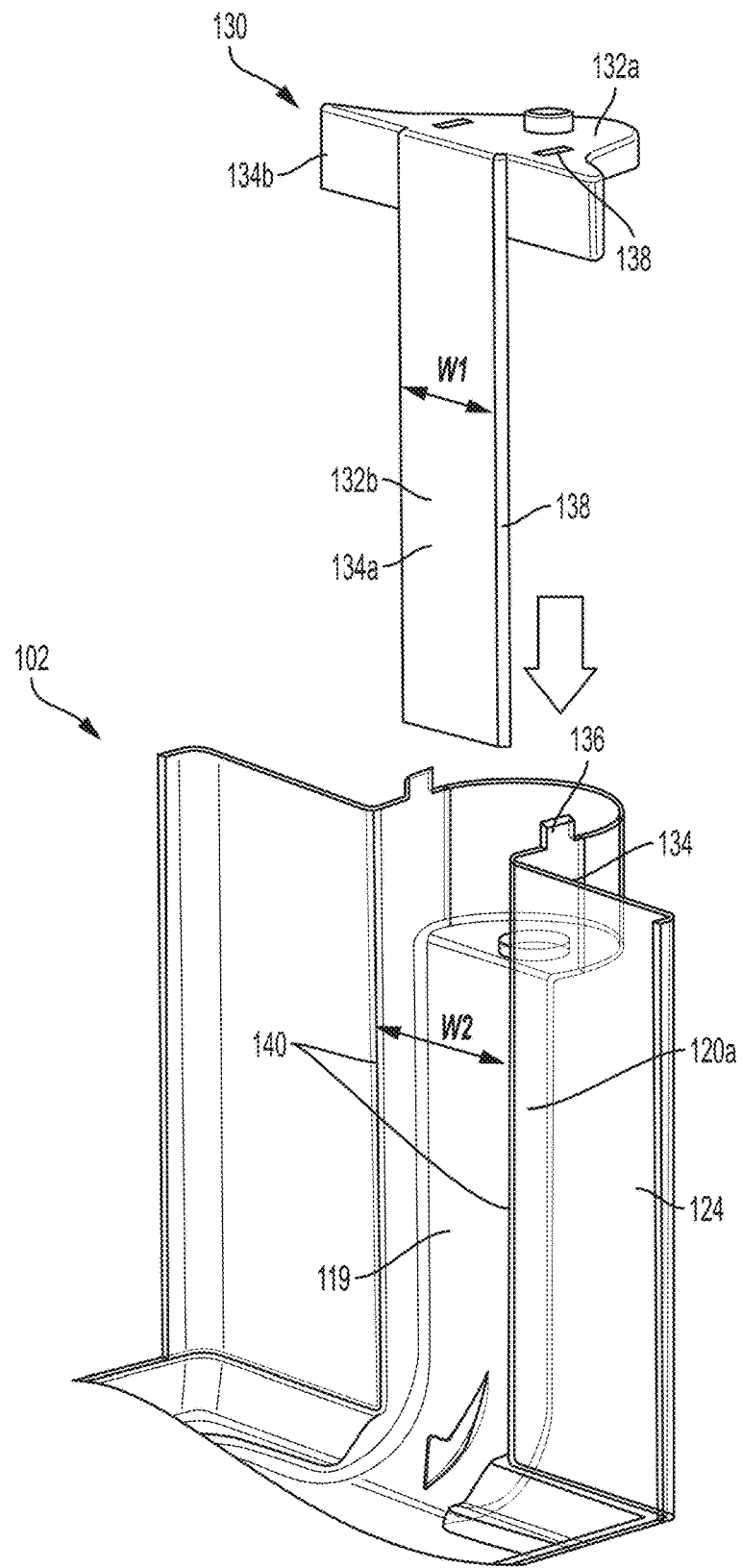
FIG. 5A is an enlarged view of a first wall of the first container in FIG. 4A with a passageway insert.
Figure 5B:
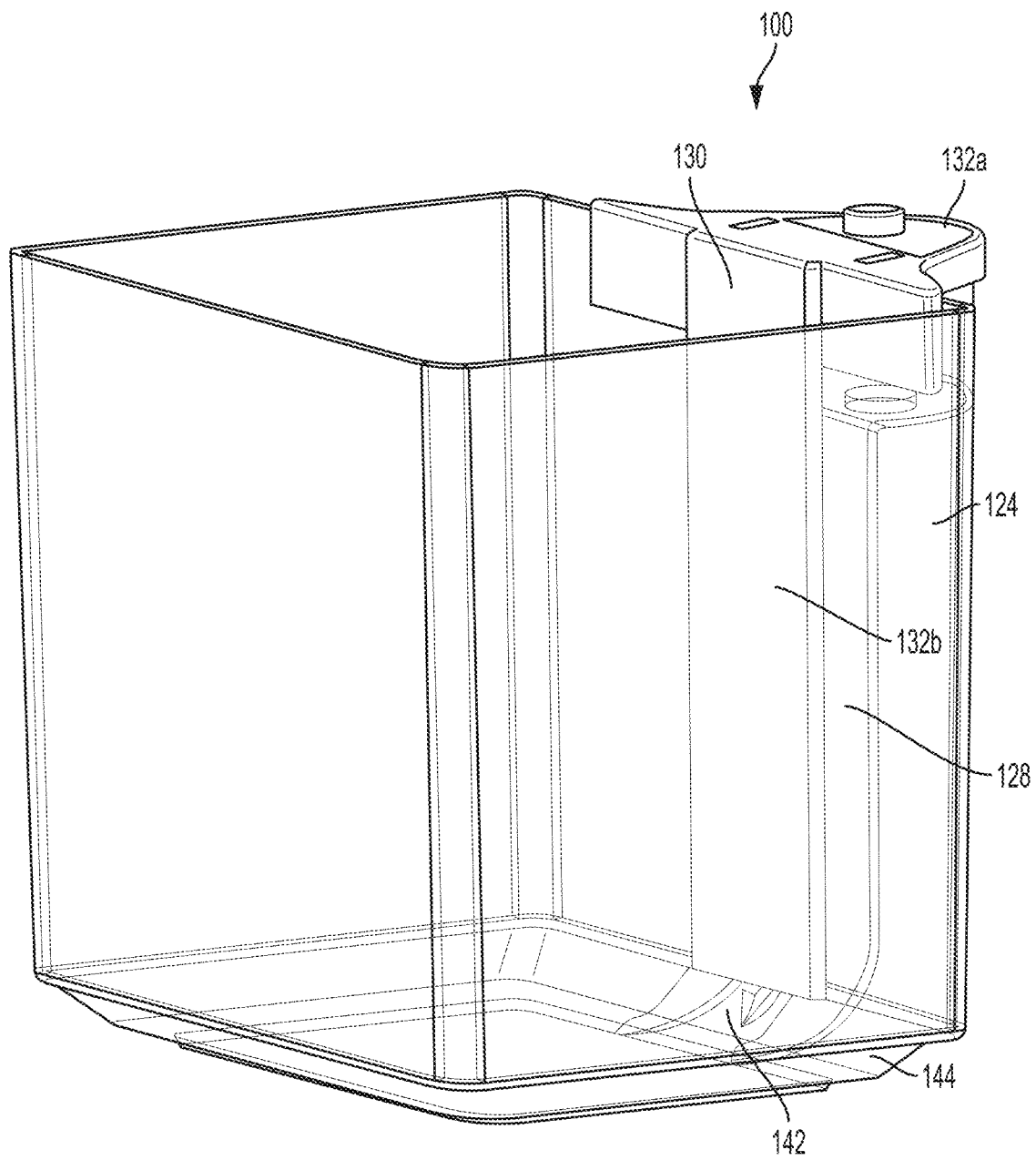
FIG. 5B is a front perspective view of the first container of FIG. 5A, with the passageway insert attached to the first container.

In some embodiments, as shown in FIGS. 5A and 5B, the passageway 128 is partially formed by the first wall 124 of the first container. For example, the passageway may be formed by a channel formed in the first wall 124 of the first container. In such embodiments, as shown in these views, the channel 119 extends outwardly beyond the first wall 124 and forms the first protruding portion 120a that is associated with the first cutout 114a of the second container. In some embodiments, a portion of the passageway 128 is formed via a passageway insert 130 that is attached to the first container 102. In such embodiments, three of the walls of the passageway are formed via the channel 119 in the first wall 124 of the first container, while the fourth wall of the passageway is formed via the passageway insert 130. As will be appreciated, although the passageway is substantially rectangular in shape, the passageway may have other suitable shapes and arrangements in other embodiments.

Figure 7:
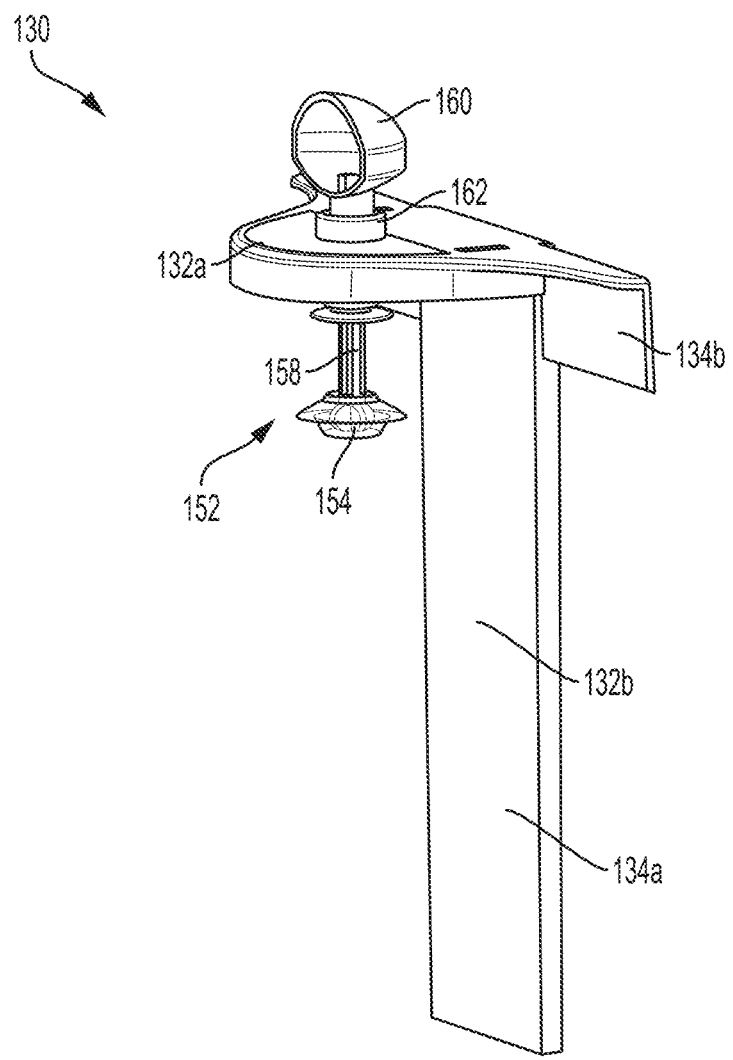
FIG. 7 is a rear perspective view of the passageway insert of FIGS. 5A and 5B.

In some embodiments, as shown in FIGS. 5A and 7, the passageway insert 130 includes a top portion 132a and a side portion 132b. As shown in FIG. 5B, the top portion 132a may be used to attach the insert 130 to the first container while the side portion may be used to form the passageway 128. In some embodiments, the side portion 132b is T-shaped, with a vertically extending member 134a and horizontally extending supporting members 134b. As shown in these views, the supporting members 134b may be positioned adjacent to the top portion 132a of the insert.

In some embodiments as shown in FIG. 5A, the insert 130 is attached to the first container 102 by slidably inserting the side portion 132b into the first container (see the arrow in FIG. 5A) until the top portion 132a of the insert reaches the top 134 of the first container, such as the top of the first side 124 of the first container. The top portion 132a of the insert 130 may then be attached to the first container. As shown in FIG. 5B, in the attached position, the top portion 132a of the insert is placed on top of the top of the first container, such as the top of the second protruding portion 120b. In such a position, the top portion 132a of the insert 130 covers the top of the second protruding portion 120b.

As shown in FIGS. 5A and 5B, in some embodiments, the shape and size of the top portion 132a of the insert corresponds to the shape and size of at least a portion of the first container. For example, in some embodiment, the top portion is curved to match the curved shape of the second protruding portion 120b. The top portion 132a also may have one or more features that engage with corresponding features on the first container. For example, as shown in FIG. 5A, the first container may have tabs 136 that are inserted into corresponding openings 138, such as slots, on the top portion 132a of the insert 130. As will be appreciated, although two tabs and two openings are shown in these views, one or more tabs and corresponding openings may be used. Such tabs and corresponding openings may be placed on any suitable location of the first container and insert. As will be further appreciated, other engagement features may be used in other embodiments. For example, the top portion of the insert may have one or more clips that engage with one or more tabs on the first container.

As also shown in FIG. 5B, in the attached portion, the vertical member 134a of the side portion 132b of the insert is slidably received in the channel 119 formed in the first wall 124 of the first container 102, and the supporting members 134b are positioned against the first wall 124. In such embodiments, the side edges 138 of the vertical member 134a may be placed adjacent to the sides 140 of the channel 119. In some embodiments, a front face of the vertical member 134a may be flush with the first side 124 of the first container.

As will be appreciated, the side edges 138 of the vertical member 134a need not have direct engagement with the side walls 140 of the channel 119. For example, in some embodiments, the sides edges 138 of the vertical member 134a may be adjacent to but not attached to the sides 140 of the channel. In other embodiments, the sides 140 of the channel 119 may include grooves into which the side edges 138 of the vertical member 134a are slidably received when the insert is inserted into the first container. The vertical member and first container may have other suitable configurations in other embodiments. For example, instead of being removably attachable to the first container, the insert may be permanently attached to the insert. In some embodiments, the insert and the first container may be integrally formed with one another.

In some embodiments, the size and shape of the vertical member 134a corresponds to the size and shape of the channel 119 in the first wall 124 of the first container 102. For example, as shown in FIG. 5A, the channel has a substantially rectangular cross section and the vertical member 134a is substantially rectangular. The width W1 of the vertically extending member 134a also corresponds to the width W2 of the opening in the first wall 124 of the first container 102. For example, as the vertical member 134 is arranged to be inserted into the channel 119 in the first container, the width W1 of the vertical member 134a is smaller than the width W2 of the opening in the first container. As will be appreciated, the insert 130 may have other suitable arrangements.

As shown in FIG. 5B, an opening 142 to the passageway 128 may be located at a bottom portion of the of the first container 102. For example, the opening 142 in the passageway may be located below the bottom of the vertical member 134b. In some embodiments, as shown in this view, a length of the vertical member 134b of the insert 130 may be the same as a length of the first wall 124 of the container 102. In such embodiments, the opening 142 may be located below the vertical member 134b, where the channel 128 intersects with the base 144 of the first container 102. In some embodiments, the opening 144 is located at a portion of the base 144 that is tapered.

In some embodiments, as shown in FIG. 6, the aquarium includes a waste collection area. For example, a waste collection insert 146 may be placed in the first container 102 for collecting waste. In some embodiments, the waste collection insert 146 includes a plate 148 with a plurality of holes 150 formed in the plate. In some embodiments, the plurality of holes may be appropriately sized such that the holes may separate larger materials and organisms located in the first container from dirt and/or debris to be removed from the first container. Other portions of the plate, such as a central portion of the plate, may be used to hold or display other aquarium feature (e.g., a figurine). As will be appreciated, the plate may have other suitable arrangements in other embodiments.

Figure 3:
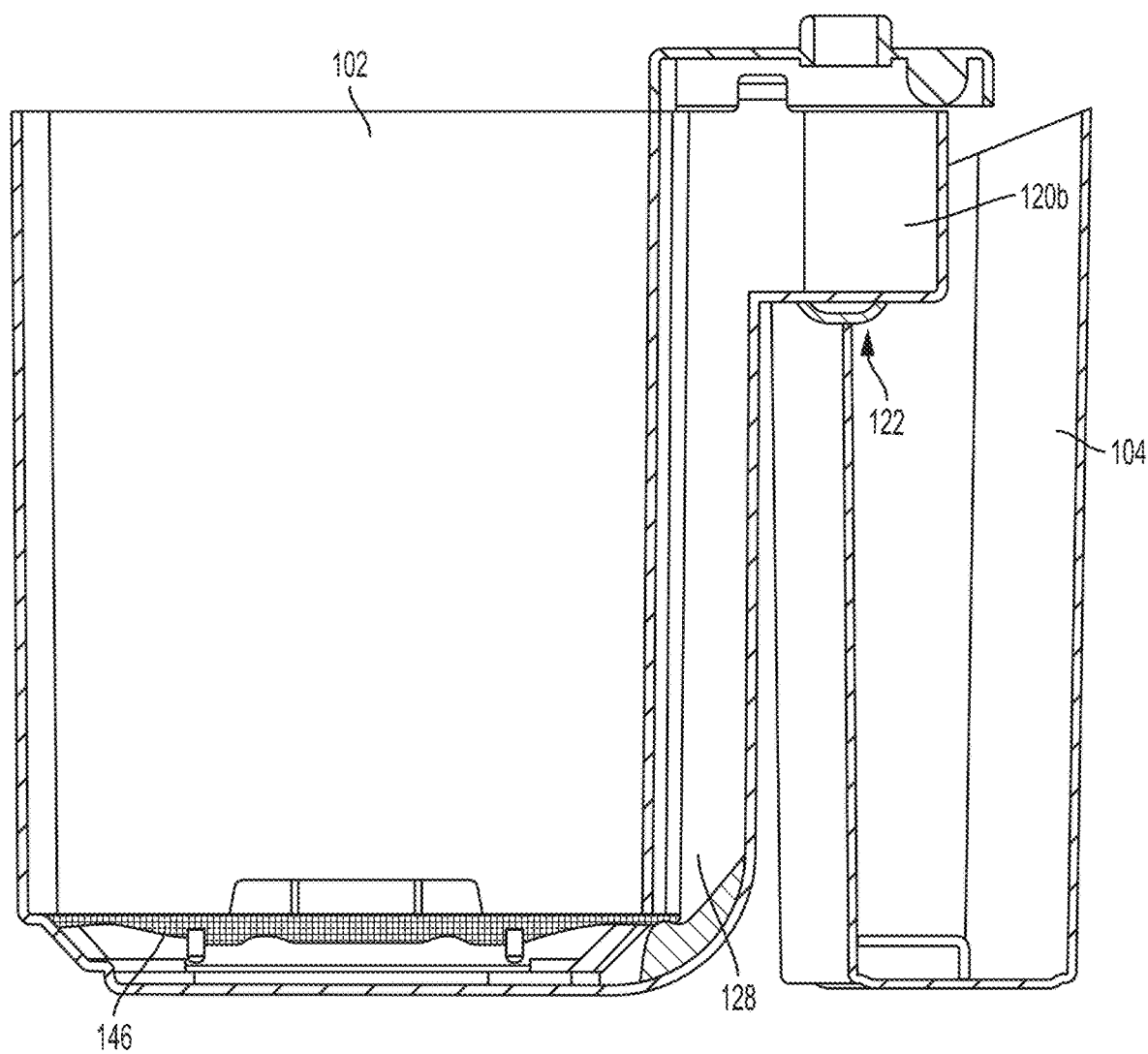
FIG. 3 is a cross-sectional schematic side view of an aquarium according to one embodiment.

As shown in FIG. 3, the waste collection insert 146 may be placed on the base 144 of the first container 102, with the plate 148 being positioned at the bottom of the passageway insert 130, where a side wall (e.g., first side wall 124) joins the base 144. In this position, the plate is positioned above the opening 142 to the passageway 128. As shown in FIGS. 3 and 8A, in such a position, fluid may pass through the plurality of holes in the cover plate to travel to the passageway opening 142 and into the passageway 128. In this regard, dirt and/or debris that are separated via the plurality of openings in the plate may travel with the water being transferred from the first container to the second container.

As previously described, and as shown in FIGS. 4A, 5A-5B and 6, the passageway 128 may terminate at the outlet 122 of the first container. As shown in these views, the outlet of the first container may be located in a protruding portion 120b that is received in the second container 104. In some embodiments, the outlet 122 may be selectively opened and closed via a valve 152 (see FIGS. 6 and 7).

In some embodiments, as shown in FIGS. 6 and 7, the valve includes a plug 154 which is arranged to block the outlet 122. In this regard, the plug 154 may be sized and shaped to create a fluid-tight seal at the opening 122. For example, at least a portion of the plug may be received in the opening, while another portion of the plug may be larger than the opening. In some embodiments, the plug 154 may be formed of a flexible material, such as silicone, which, in some embodiments, may allow the plug to form the fluid-tight seal of the opening.

In some embodiments, as shown in FIGS. 6 and 7, the valve may include a biasing member, such as spring 156, which is arranged to bias the valve in the closed position (e.g., bias the plug into the outlet). As will be appreciated, other suitable biasing members may be used in other embodiments. The valve also may include a connecting member 158, arranged to connect the plug 154 to a handle 160 that is graspable by a user. As shown in these views, a first end of the connecting member may be attached to the plug 154, such as by a press-fit attachment. The second end of the connecting member 158 may be connected to the handle 160 via a snap fit, press fit, or other suitable attachment method.

As shown in FIGS. 6 and 7, in some embodiments, the valve is attached to the passageway insert 130. In such embodiments, the connecting member may be passed through an opening 162 in the top 132a of the insert, such that the handle 160 may be positioned on a first side of the insert for grasping by the user while the plug 154 and biasing member are positioned on a second, opposite side of the insert for engaging the outlet 122 of the first container.

As will be appreciated, although the valve is shown as being attached to the passageway insert 130, the valve may be attached to other suitable portions of the aquarium in other embodiments. For example, as shown in FIG. 1, the handle 160 and valve 162 may be attached to the cover 106 of the aquarium. As will be further appreciated, although a valve is used to open and close the outlet of the first container, other suitable arrangements may be used in other embodiments.

In some embodiment, as shown in FIGS. 1-2, 4B and 6, the second container may be formed of an opaque material such that the dirty water and/or debris is not visible to the user if the second container is not emptied. In some embodiments, the second container may include a fluid level indicator 164 arranged to show the user the amount of fluid in the second container. As will be appreciated, such a fluid level indicator may assist the user in knowing how much additional dirty water and/or debris may be added to the second container and/or when the second container should be emptied. In some embodiments, for example, the water may be transferred from the first container to the second container more than one time, such as two or three times, prior to the second container being emptied.

In some embodiments, as shown in FIGS. 4B and 6, the fluid level indicator may include a floating member, such as the float 166, and a float retainer 168. In some embodiments, as shown in these views, the float may include a spherical member. In some embodiments, as the fluid level in the second container 104 increases, the float is displaced upwardly in the float retainer 168.

In some embodiments, the float retainer 168 is formed of a transparent material such that the user may view the position of the float in the float retainer. In some embodiments, the float retainer includes a label 170, such as a label that says MAX, to indicate the maximum volume of fluid that may be held by the second container. Without wishing to be bound by theory, fluid may leak out of the second container if the fluid level exceeds the prescribed maximum level noted by the float retainer. In some embodiments, as shown in FIG. 4B, the maximum fluid level is chosen based upon the location of the outlet of the first container and the corresponding cutout in the second container formed to receive the outlet. For example, as shown in this view, the maximum fluid level is positioned below the second cutout 114b that receives the outlet 122.

FIG. 8A-FIG. 11 illustrate embodiments in which dirty water and/or debris is transferred from the first container to the second container. In some embodiments, as shown in FIG. 8A, a water level L1 in the first container is above a height H1 of the outlet 122 of the first container. As previously described, such a water level may create a pressure differential that may drive movement of the water from the first container to the second container when the valve is opened. As will be appreciated, and as shown in this view, water may pass from the bottom of the first container, through the passageway opening and into the passageway when the outlet of the first container 122 is in a closed position.

Although the second container is shown as being empty in this view, it will be appreciated that the second container may include fluid in other embodiments. For example, if the user has already transferred dirty water and/or debris into the second container, the second container may not be empty upon a subsequent transfer.

As shown in FIG. 8A, to transfer water from the first container 102 to the second container 104, the handle 160 may be grasped by the user and moved in an upward direction (see arrow), away from the cover 106 of the aquarium 100. As will be appreciated in view of the above, movement of the handle 160 in the upward direction moves the valve into the open position, with the plug 154 being moved away from the outlet 122, opening the outlet 122.

Figure 9:
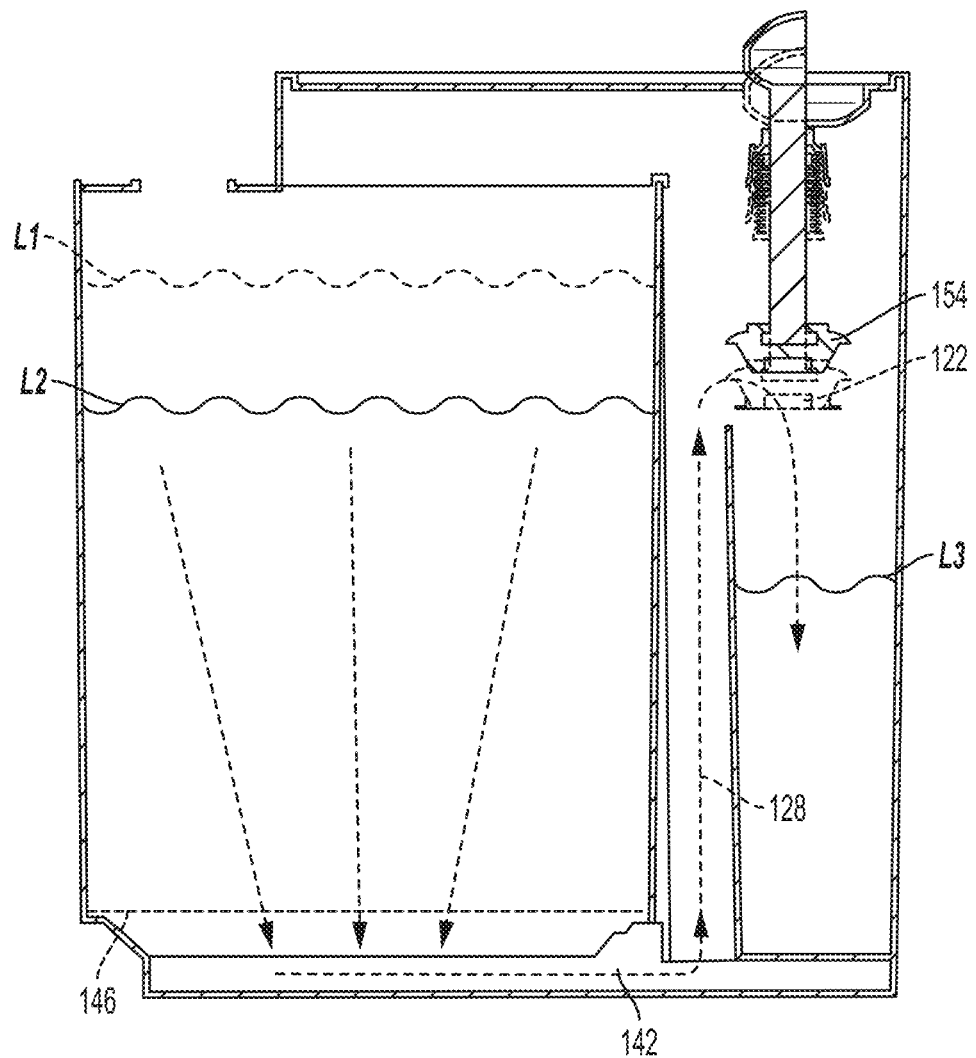

As shown in FIG. 9, when the valve is in an open position, water may travel from the first container 102 to the second container 102 via the outlet 122. As shown by the arrows in FIG. 9, water may move downwardly towards the bottom of the first container, where the water passes through the plurality of openings in the waste collection insert 146, through the opening 142 of the passageway, through the passageway 128, and out of the outlet 122 into the second container. As will be appreciated in view of the above, as water travels from the first container to the second container and passes through the openings in the waste collection insert 146, dirt and debris may be entrained by and travel with the water to the second container.

As also shown in FIG. 9, as water is transferred to the second container, the water level in the first container may be decreased from the first level L1 to a second, lower level L2. In such an embodiment, the second level L2 may be at or below the height of the outlet 122. The water level in the second container 104 may be increased to a first level L3.

To stop transferring water from the first container to the second container, the user may release the handle such that the valve is closed and the plug returns to the outlet 122, closing the outlet 122. In such embodiments, as the valve is biased in the closed position, releasing the handle may automatically return the plug to the outlet. As will be appreciated, the user also may move the handle in a downward direction (e.g., opposite to the arrow shown in FIG. 8A) to return the plug to the outlet. In other embodiments, if the water level in the first container decreases below the height H1 of the outlet, the pressure differential may decrease such that water does not move from the first container to the second container. In this regard, water may automatically stop moving from the first container to the second container even if the valve is in the open position.

Figure 10:
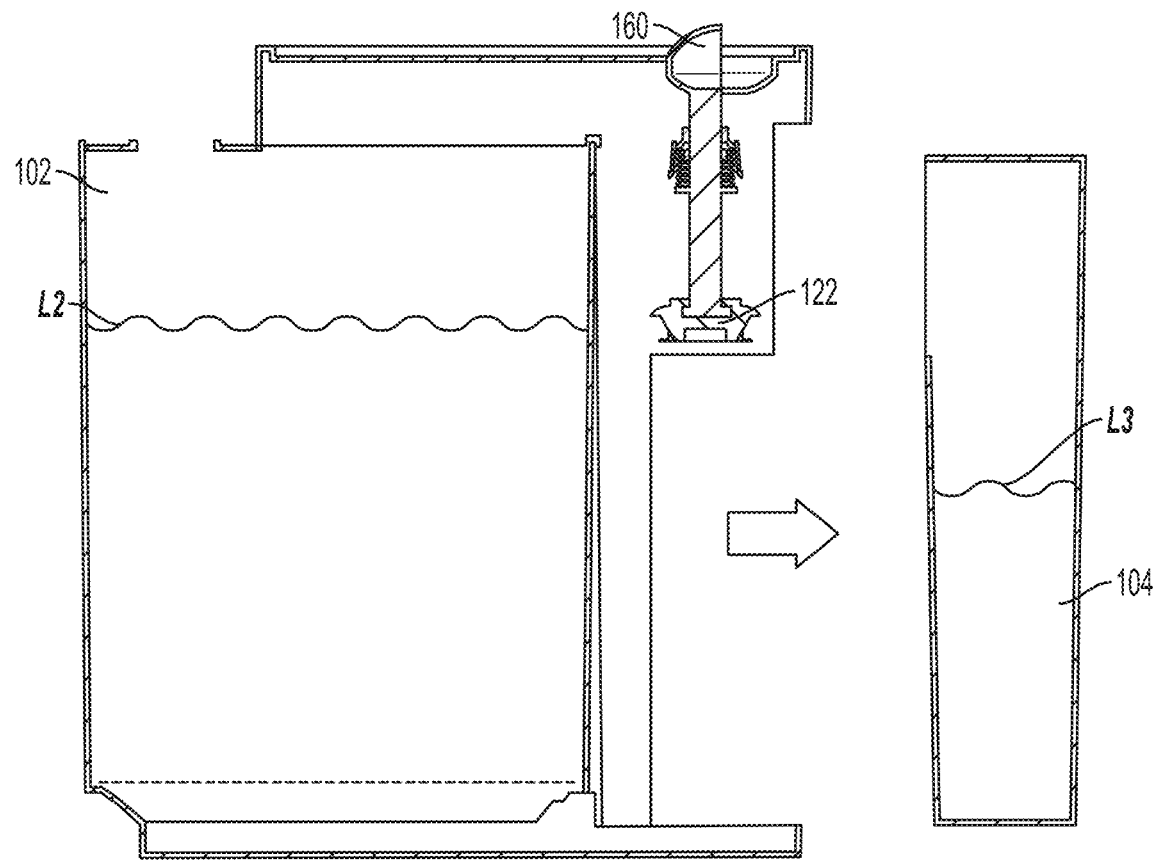
Figure 11:
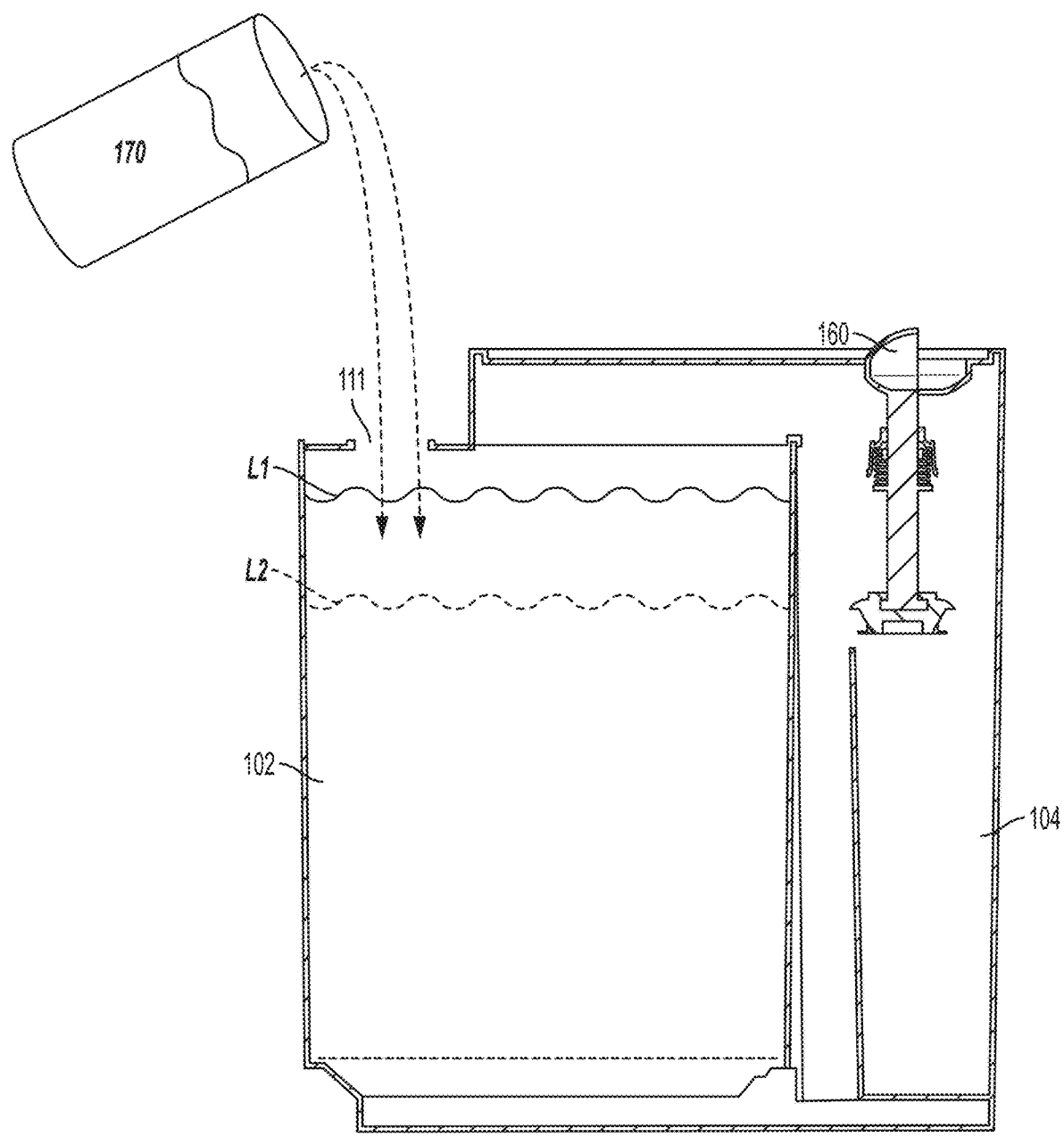

FIG. 10 shows an embodiment in which the handle 160 has been released and the valve is in the closed position. As shown in this view, after transferring dirty water and/or debris, the user may remove the second container 104 from the aquarium and discard the dirty water and/or debris in the second container. As shown in FIG. 11, the second container can thereafter be returned to the aquarium. Finally, as shown in FIG. 11, water 170 may be added to the first container, such as via the opening 111 in the cover, to increase the water level in the first container (e.g., from level L2 to level L1). As will be appreciated, the above steps may be repeated by the user any time the user wants to remove dirty water and/or debris from the tank.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:
1. An aquarium comprising:
a first container arranged to hold a fluid, the first container having an outlet and a passageway in fluid communication with the outlet, wherein fluid flows from the first container to the outlet via the passageway, the outlet being selectively opened and closed via a valve, the valve being biased in a closed position; and
a second container arranged to hold a fluid, wherein the second container is arranged to mate with the first container such that the second container receives the outlet of the first container, and wherein fluid flows from the passageway through the outlet and into the second container when the valve is in an open position.

2. The aquarium of claim 1, wherein the first container includes a channel formed in a first wall of the first container.

3. The aquarium of claim 2, wherein the passageway is at least partially formed via the channel.

4. The aquarium of claim 3, further comprising a passageway insert attached to the first wall of the first container.

5. The aquarium of claim 4, wherein the passageway is at least partially formed via the passageway insert.

6. The aquarium of claim 5, wherein the passageway insert includes a vertically extending member that is slidably received in the channel.

7. The aquarium of claim 2, wherein the channel extends outwardly from the first wall of the first container.

8. The aquarium of claim 2, wherein the channel is vertically extending.

9. The aquarium of claim 2, wherein the second container includes a cutout arranged to receive the outwardly extending channel formed in the first container.

10. The aquarium of claim 1, wherein the valve is disposed in the first container.

11. The aquarium of claim 1, wherein the valve is attached to a passageway insert.

12. The aquarium of claim 1, wherein the valve includes a plug arranged to block the outlet when the valve is in a closed position.

13. The aquarium of claim 12, wherein the valve includes a handle operatively coupled to the plug, the handle being graspable by a user to move the valve into the open position.

14. The aquarium of claim 1, further comprising a waste collection insert arranged to be placed on a bottom of the first container.

15. The aquarium of claim 14, wherein the waste collection insert includes a plate with a plurality of holes.

16. The aquarium of claim 14, wherein the waste collection insert is positioned above an entrance to the passageway, wherein fluid flows through the waste collection insert to the outlet and into the second container.

17. The aquarium of claim 1, further comprising a base arranged to receive the first and second containers.

18. The aquarium of claim 17, wherein the second container is removably attached to the base.

19. The aquarium of claim 18, wherein the second container includes one or more cutouts arranged to engage with one or more corresponding protrusions on the base such that the second container is retained in a desired position and orientation in the base.

20. The aquarium of claim 1, wherein the second container includes a cutout arranged to receive a protruding portion of the first container, the outlet being disposed in the protruding portion.

21. A method of removing dirty water from an aquarium, the method comprising:
    mating a second container to a first container, the first container having an outlet and a passageway in fluid communication with the outlet, wherein fluid flows from the first container to the outlet via the passageway, the second container being arranged to receive the outlet, the outlet being selectively opened and closed via a valve, the valve being biased in a closed position; and
    moving the valve into an open position, wherein fluid flows from the first container through the outlet and into the second container, waste being entrained with the flowing fluid and transferred to the second container.

22. The method of claim 21, wherein moving the valve includes moving a handle operatively connected to a plug in a direction away from the outlet to move the plug out of the outlet.

23. The method of claim 21, further comprising closing the valve, wherein fluid stops flowing from the first container through the outlet and into the second container.

24. The method of claim 23, further comprising removing the second container from the aquarium and discarding fluid contained in the second container.

25. An aquarium comprising:
    a first container arranged to hold a fluid, the first container having an outlet and a passageway in fluid communication with the outlet, wherein fluid flows from the first container to the outlet via the passageway, the outlet being selectively opened and closed via a valve, wherein the valve is arranged to block the outlet when the valve is in a closed position, and wherein the valve includes a handle operatively coupled to the valve; and
    a second container arranged to hold a fluid, wherein the second container is arranged to mate with the first container such that the second container receives the outlet of the first container, wherein fluid flows from the passageway through the outlet and into the second container when the valve is in an open position, the handle being graspable by a user to move the valve into the open position.

26. The aquarium of claim 25, wherein the valve is disposed in the first container.

\* \* \* \* \*